US006245416B1

(12) United States Patent
Roth

(10) Patent No.: US 6,245,416 B1
(45) Date of Patent: *Jun. 12, 2001

(54) WATER SOLUBLE SILICONE RESIN BACKCOAT FOR THERMAL TRANSFER RIBBONS

(75) Inventor: Joseph D. Roth, Springboro, OH (US)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/082,249

(22) Filed: May 20, 1998

(51) Int. Cl.[7] ........................................ B32B 3/00

(52) U.S. Cl. ........................ 428/195; 428/913; 428/914

(58) Field of Search ................................ 428/195, 447, 428/488.4, 9.3, 914; 503/227

(56) References Cited

U.S. PATENT DOCUMENTS

| | | | | |
|---|---|---|---|---|
| 3,663,278 | | 5/1972 | Blose et al. . | |
| 4,315,643 | | 2/1982 | Tokunaga et al. . | |
| 4,403,224 | | 9/1983 | Wirnowski . | |
| 4,463,034 | | 7/1984 | Tokunaga et al. . | |
| 4,628,000 | | 12/1986 | Talvalkar et al. . | |
| 4,687,701 | | 8/1987 | Knirsch et al. . | |
| 4,707,395 | | 11/1987 | Ueyama et al. . | |
| 4,777,079 | | 10/1988 | Nagamoto et al. . | |
| 4,778,729 | | 10/1988 | Mizobuchi . | |
| 4,923,749 | | 5/1990 | Talvalkar . | |
| 4,975,332 | | 12/1990 | Shini et al. . | |
| 4,983,446 | | 1/1991 | Taniguchi et al. . | |
| 4,988,563 | | 1/1991 | Wehr . | |
| 4,990,486 | * | 2/1991 | Kamosaki et al. | 503/227 |
| 5,128,308 | | 7/1992 | Talvalkar . | |
| 5,240,781 | | 8/1993 | Obata et al. . | |
| 5,240,899 | * | 8/1993 | Bowman et al. | 503/227 |
| 5,248,652 | | 9/1993 | Talvalkar . | |
| 5,290,623 | * | 3/1994 | Kawahito et al. | 428/195 |
| 5,348,348 | | 9/1994 | Hanada et al. . | |
| 5,397,764 | * | 3/1995 | Yokoyama et al. | 428/195 |
| 5,409,884 | * | 4/1995 | Harada et al. | 503/227 |
| 5,474,970 | * | 12/1995 | Defieuw et al. | 503/227 |
| 5,662,989 | * | 9/1997 | Obata et al. | 428/212 |
| 6,077,594 | * | 6/2000 | Roth | 428/195 |

FOREIGN PATENT DOCUMENTS

| | | | | |
|---|---|---|---|---|
| 61-143195 | * | 6/1986 | (JP) | B41M/5/26 |
| 06122282A | * | 9/1988 | (JP) | B41M/5/40 |
| 63-227384 | * | 9/1998 | (JP) | B41M/5/26 |

OTHER PUBLICATIONS

Gelest, Inc. Product Brochure: Silicone Fluids; p. 20.*

* cited by examiner

*Primary Examiner*—Bruce H. Hess
*Assistant Examiner*—Michael E. Grendzynski
(74) *Attorney, Agent, or Firm*—Millen White Zelano & Branigan PC

(57) ABSTRACT

A thermal transfer ribbon comprised of a flexible substrate, a thermal transfer layer on one surface of the substrate and a backcoat on the opposite surface of the substrate comprised of a water-soluble silicone block copolymer with blocks of silicone resin and water-soluble polymer.

12 Claims, No Drawings

WATER SOLUBLE SILICONE RESIN BACKCOAT FOR THERMAL TRANSFER RIBBONS

FIELD OF THE INVENTION

The present invention relates to print ribbons used in thermal transfer printing wherein images are formed on paper or other receiving substrate by heating extremely precise areas of the print ribbon with thin film resistors. This heating of localized areas causes transfer of a layer with a sensible material from the ribbon's supporting substrate to the paper receiving substrate. The sensible material is typically a pigment or dye which can be detected optically or magnetically.

More particularly, the present invention is directed to print ribbons which have a protective backcoat on the supporting substrate which protects the print head and avoids sticking.

BACKGROUND OF THE INVENTION

Thermal transfer printing has displaced impact printing in many applications due to advances such as the relatively low noise levels which are attained during the printing operation. Thermal transfer printing is widely used in special applications such as in the printing of machine readable bar codes and magnetic alpha-numeric characters. The thermal transfer process provides great flexibility in generating images and allows for broad variations in style, size and color of the printed image. Representative documentation in the area of thermal printing includes the following patents:

U.S. Pat. No. 3,663,278, issued to J. H. Blose, et al. on May 16, 1972, discloses a thermal transfer medium comprising a base with a coating comprising of cellulosic polymer, thermoplastic aminotriazine-sulfonamide-aldehyde resin, plasticizer and a "sensible" material such as a dye or pigment.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,463,034, issued to Y. Tokunaga et al. on Jul. 31, 1984, discloses a heat-sensitive magnetic transfer element having a hot melt or a solvent coating.

U.S. Pat. No. 4,628,000, issued to S. G. Talvalkar et al. on Dec. 9, 1986, discloses a coating formulation that includes an adhesive-plasticizer or sucrose benzoate transfer agent and a coloring material or pigment.

U.S. Pat. No. 4,687,701, issued to K. Knirsch et al. on Aug. 18, 1987, discloses a heat sensitive inked element using a blend of thermoplastic resins and waxes.

U.S. Pat. No. 4,707,395, issued to S. Ueyama et al., on Nov. 17, 1987, discloses a substrate, a heat-sensitive releasing layer, a coloring agent layer, and a heat-sensitive cohesive layer.

U.S. Pat. No. 4,777,079, issued to M. Nagamoto et al. on Oct. 11, 1988, discloses an image transfer type thermosensitive recording medium using thermosoftening resins and a coloring agent.

U.S. Pat. No. 4,778,729, issued to A. Mizobuchi on Oct. 18, 1988, discloses a heat transfer sheet comprising a hot melt ink layer on one surface of a film and a filling layer laminated on the ink layer.

U.S. Pat. No. 4,923,749, issued to Talvalkar on May 8, 1990, discloses a thermal transfer ribbon which comprises two layers, a thermosensitive layer and a protective layer, both of which are water based.

U.S. Pat. No. 4,975,332, issued to Shini et al. on Dec. 4, 1990, discloses a recording medium for transfer printing comprising a base film, an adhesiveness improving layer, an electrically resistant layer and a heat sensitive transfer ink layer.

U.S. Pat. No. 4,983,446, issued to Taniguchi et al. on Jan. 8, 1991, describes a thermal image transfer recording medium which comprises as a main component, a saturated linear polyester resin.

U.S. Pat. No. 4,988,563, issued to Wehr on Jan. 29, 1991, discloses a thermal transfer ribbon having a thermal sensitive coating and a protective coating. The protective coating is a wax-copolymer mixture which reduces ribbon offset.

U.S. Pat. Nos. 5,128,308 and 5,248,652, issued to Talvalkar, each disclose a thermal transfer ribbon having a reactive dye which generates color when exposed to heat from a thermal transfer printer.

U.S. Pat. No. 5,240,781, issued to Obatta et al., discloses an ink ribbon for thermal transfer printers having a thermal transfer layer comprising a wax-like substance as a main component and a thermoplastic adhesive layer having a film forming property.

Thermal transfer ribbons are a common form of thermal transfer media. Most thermal transfer ribbons employ polyethylene terephthalate (PET) polyester as a substrate. The functional layer which transfers ink, also referred to as the thermal transfer layer, is deposited on one side of the substrate and a protective backcoat is deposited on the other side of the polyethylene terephthalate substrate. Untreated polyethylene terephthalate will not pass under a thermal print head without problems. The side of the polyethylene terephthalate substrate which comes in contact with the print head, i.e., the side opposite the thermal transfer layer, must be protected during the printing process. Failure to do so will result in the polyethylene terephthalate sticking to the heating elements during the heating cycle. Polyethylene terephthalate is also an abrasive material which will cause unacceptable wear on the print head. Therefore, conventional thermal transfer ribbons which employ a polyethylene terephthalate substrate treat the backside of the substrate as part of the coating process to form a barrier between the polyethylene terephthalate and the print head. This material is referred to herein as a "backcoat".

The backcoats are usually comprised of silicone polymers. The most common backcoats are silicone oils and UV cured silicones. The silicone oils can be delivered directly to the PET substrate or via an organic solvent. For direct delivery to the web, a multi-roll coater head is used. Multi-roll coating heads are expensive, difficult to operate and often require high coat weights to obtain uniform coverage when compared to solvent-based coating systems. The precursors to UV cured silicones are applied directly to the web, as well, and suffer from the same disadvantages associated with delivering silicone oils directly to the PET substrate coupled with other additional requirements of curing the silicone coating. Forming backcoats with an organic solvent based system allows for the use of simpler coating methods and equipment while providing more uniform coatings at low coat weights. These cost advantages are limited or lost due to the need to reclaim or incinerate the organic solvent removed from the PET substrate. The organic solvents are considered to be environmentally unfriendly and may also create exposure hazards for operators. The energy costs to remove the organic solvent and costs of investment and operation of organic solvent reclaimers and incinerators are significant. Replacing the organic solvents for these silicone oils with water requires the use of an emulsifier. Conventional emulsifiers contribute to increased buildup on the thermal print heads, resulting in increased wear.

A suitable replacement for the silicone oils has not been found. Other materials which can be coated with an aqueous solvent either suffer from the same disadvantages such as requiring an emulsifier which degrades the print head, or they do not provide the performance of the silicone oils, often building up on the print head requiring periodic cleaning.

SUMMARY OF THE INVENTION

It is an object of the present invention to provide a thermal transfer ribbon having a PET substrate with a backcoat applied by solvent based methods without the need to remove, recover or incinerate organic solvent.

It is an additional object of the present invention to provide a thermal transfer ribbon with a thin silicone resin backcoat applied with an aqueous solvent without aggressive emulsifiers.

It is another object of the present invention to provide a thermal transfer ribbon having a PET substrate with a silicone resin backcoat applied with an aqueous solvent which provides equivalent or better performance than silicone oils applied directly to a PET substrate or with an organic solvent.

These and other objects and advantages of the present invention will become apparent and further understood from the detailed description and claims which follow, together with the annexed drawings.

The above objects are achieved through the thermal transfer ribbon of the present invention which employs a novel backcoat. The thermal transfer ribbon of the present invention comprises a substrate, a thermal transfer layer which transfers to paper or other receiving substrate when exposed to an operating print head of a thermal transfer printer and a backcoat comprising a water soluble silicone resin block copolymer comprising silicone resin blocks and blocks of water soluble resin.

DETAILED DESCRIPTION OF THE PREFERRED EMBODIMENTS

The thermal transfer ribbons of this invention comprise a substrate which is preferably polyethylene terephthalate. The thickness of the substrate can vary widely and is preferably from 3 to 50 microns. Films of about 4.5 micron thickness are most preferred. While the coating formulations and ribbons of the present invention work well with polyethylene terephthalate substrates, they are not limited to the use of such substrates. Materials such as polyethylene naphthalate films, polyamide films, e.g., nylon, polyolefin films, e.g., polypropylene film, cellulose films, e.g., triacetate film and polycarbonate films can also be used. The substrate should have high tensile strength to provide ease in handling and coating, and preferably provide these properties at a minimum thickness and low heat resistance to prolong the life of the heating elements within thermal print heads.

The thermal transfer ribbons of this invention also comprise a thermal transfer layer, also referred to herein as a functional layer. Any conventional thermal transfer layer which will transfer to paper or other receiving substrate when exposed to the heat and pressure of an operating print head is suitable. Such functional layers can comprise one or more waxes, binder resins, and sensible materials (pigments) discussed below. The thermal transfer ribbons of the present invention additionally contain a backcoat which comprises a water-soluble silicone block copolymer comprised of silicone resin blocks of the formula $R'_x(SiR_xZO)_wSi(R''_x)_3$ and blocks of water-soluble polymers selected from the group consisting of polyethylene oxide blocks and polypropylene oxide blocks wherein $R_x$ is H, OH or $C_1$–$C_6$-alkyl, w is 2–300 and Z is $R_x$ or a link to other blocks.

Silicone resin block copolymer materials which are preferred include those available from Gelest, Inc, Tullytown, Pa. Suitable examples include the silicone block copolymers sold under the trade names DBE-712, DBE-814, DBE-821, DBP-732 and DBP-534 provided by Gelest, Inc. The silicone block copolymer is preferably applied with deionized water and an antifoaming agent. The use of deionized water helps prevent the formation of corrosive agents which attack the print head. The foaming agent aids the coating process to allow simple coating equipment, such as a Meyer rod, to be used to form thin coatings. Alternative methods for applying the backcoat to the substrate are suitable. The silicone block copolymer is preferably applied to the substrate by a backcoat coating formulation which employs from 0.5 to 10 wt. % silicone block copolymer, and 0.01 to 0.1 wt. % defoamer with the balance being deionized or distilled water. This backcoat coating formulation can be applied with a #0 Meyer rod. The silicone block copolymer is preferably employed in an amount in the range of about 2 to 10 wt. % of the coating formulation.

The silicone block copolymer comprises silicone resin blocks of the structure below:

$$R'_3\text{—}SiO(SiR_2O)_x(\overset{\displaystyle Q}{\overset{|}{Si}}R'''O)_y\text{—}SiR''_3$$

wherein R, R', R" and R'" are each, independently, H, OH, $CH_3$, ethyl or propyl, Q is a link to other blocks, and x and y are 1 or more.

Preferably, X is 1–200 and y is preferably 1–200. Most preferably, y and x have values which provide the preferred molecular weights and preferred amounts of water-soluble polymer discussed below.

The water-soluble polymer resin blocks are preferably selected from polyethylene oxide and polypropylene oxides of the formulae $$\text{—}(CH_2)_3\text{—}(OCH_2CH_2)_z\text{—}OCH_3$$

and $$\text{—}(CH_2)_3\text{—}(OCH_2CH_2CH_2)_z\text{—}OCH_3,$$

wherein Z is 1 to 100.

The blocks of the water-soluble polymer preferably comprise over 50 wt. % of the silicone block copolymer, the balance being silicone blocks. The molecular weight of the silicone block copolymer can range from about 200 to 50,000, and is preferably from 600 to 30,000. Ethylene oxide blocks preferably comprise at least 75 wt. % of the copolymer. Combinations of ethylene oxide and propylene oxide blocks can be used. The silicone block copolymers with ethylene oxide blocks preferably have a molecular weight in the range from 200 to 5,000 weight average molecular weight and a viscosity of 20–125 cps. The silicone block copolymers with both ethylene oxide and propylene oxide blocks preferably have a viscosity of 1,000–4,000 cps and molecular weight in the range of 10,000–40,000 weight average molecular weight.

The coating formulation for the backcoat can be prepared in conventional equipment by simply mixing deionized water, block copolymer and antifoaming agent at ambient temperature for about 30 minutes. The formulation is suitable for coating onto a substrate when thoroughly mixed.

Although not preferred, organic solvents can be used in coating formulations for the backcoat. Suitable polar organic solvents are esters, ketones, ethers and alcohols.

The functional layer typically comprises wax as a main component. Suitable waxes include those used in conventional thermal transfer ribbons. Examples include natural waxes such as carnauba wax, rice bran wax, bees wax, lanolin, candelilla wax, motan wax and ceresine wax; petroleum waxes such as paraffin wax and microcrystalline waxes; synthetic hydrocarbon waxes such as low molecular weight polyethylene and Fisher-Tropsch wax; higher fatty acids such as lauric acid, myristic acid, palmitic acid, stearic acid and behenic acid; higher aliphatic alcohol such as stearyl alcohol and esters such as sucrose fatty acid esters, sorbitane fatty acid esters and amides. The wax-like substances have a melting point less than 200 C and preferably from 40 C to 130 C. The amount of wax in the functional coating formulation is preferably above 5 wt. % and most preferably ranges from 10 to 85 percent by weight, based on the weight of dry ingredients.

The functional layer also comprises a binder resin. Suitable binder resins are those conventionally used in thermal transfer ribbons. These include thermoplastic resins and reactive resins such as epoxy resins.

Suitable thermoplastic binder resins include those described in U.S. Pat. Nos. 5,240,781 and 5,348,348 which have a melting point of less than 300 C, preferably from 100 C to 225 C. Examples of suitable thermoplastic resins include polyvinyl chloride, polyvinyl acetate, vinyl chloride-vinyl acetate copolymers, polyethylene, polypropylene, polyacetal, ethylene-vinyl acetate copolymers, ethylene alkyl (meth)acrylate copolymers, ethylene-ethyl acetate copolymers, polystyrene, styrene copolymers, polyamide, ethylcellulose, epoxy resin, xylene resin, ketone resin, petroleum resin, terpene resin, polyurethane resin, polyvinyl butyryl, styrene-butadiene rubber, saturated polyesters, styrene-alkyl (meth)acrylate copolymer, ethylene alkyl (meth)acrylate copolymers. Suitable saturated polyesters are further described in U.S. Pat. No. 4,983,446. Thermoplastic resins are preferably used in an amount of from 2 to 50 wt. % of the functional layer.

Suitable reactive binder components include epoxy resins and a polymerization initiator (crosslinker). Suitable epoxy resins include those that have at least two oxirane groups such as epoxy novolak resins obtained by reacting epichlorohydrin with phenol/formaldehyde condensates or cresol/formaldehyde condensates. Another preferred epoxy resin is polyglycidyl ether polymers obtained by reaction of epichlorohydrin with a polyhydroxy monomer such as 1,4 butanediol. A specific example of suitable epoxy novolak resin is Epon 164 available from Shell Chemical Company. A specific example of the polyglycidyl ether is available from Ciba-Geigy Corporation under the trade name Araldite® GT 7013. The epoxy resins are preferably employed with a crosslinker which activates upon exposure to the heat from a thermal print head. Preferred crosslinkers include polyamines with at least two primary or secondary amine groups. Examples being Epi-cure P101 and Ancamine 2014FG available from Shell Chemical Company and Air Products, respectively. Accelerators such as triglycidylisocyanurate can be used with the crosslinker to accelerate the reaction. When used, the epoxy resins typically comprise more than 25 weight percent of the functional coating. Waxes are typically not necessary when reactive epoxy resins form the binder.

The functional layer also contains a sensible material or pigment which is capable of being sensed visually, by optical means, by magnetic means, by electroconductive means or by photoelectric means. The sensible material is typically a coloring agent, such as a dye or pigment, or magnetic particles. Any coloring agent used in conventional ink ribbons is suitable, including carbon black and a variety of organic and inorganic coloring pigments and dyes, examples of which include phthalocyanine dyes, fluorescent naphthalimide dyes and others such as cadmium, primrose, chrome yellow, ultra marine blue, titanium dioxide, zinc oxide, iron oxide, cobalt oxide, nickel oxide, etc. Examples of sensible materials include those described in U.S. Pat. No. 3,663,278 and U.S. Pat. No. 4,923,749. Reactive dyes such as leuco dyes are also suitable. In the case of magnetic thermal printing, the thermal transfer layer includes a magnetic pigment or particles for use in imaging to enable optical human or machine reading of the characters. This provides the advantage of encoding or imaging the substrate with a magnetic signal inducible ink. The sensible material or pigment is typically used in an amount of from 1 to 50 parts by weight of the functional layer.

The thermal transfer layer (functional layer) preferably has a softening point within the range of about 50 C to 250 C which enables transfer at normal print head energies which range from about 100 C to 250 C and more typically from about 100 C to 150 C. The functional layers can be applied by conventional techniques and equipment such as a Meyer Rod or like wire round doctor bar set up on a conventional coating machine to provide the coating weights described above. The coat weight of the thermal transfer layer typically ranges from 1.9 to 5.0 g/m$^2$. The functional layers is optionally passed through a dryer at an elevated temperature to ensure drying and adherence to the substrate. The thermal transfer layer can be fully transferred onto a receiving substrate such as paper or synthetic resin at a temperature in the range of 75 C to 200 C.

The thermal transfer ribbon of the present invention provides the advantages of thermal printing. When the thermal transfer ribbon is exposed to the heating elements of the thermal print head, the thermal transfer layer softens and transfers from the ribbon to the receiving substrate. The backcoat of silicone block copolymer prevents sticking of the substrate to the thermal print head.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, are hereby incorporated by reference.

EXAMPLES

Example 1

Backcoat Formulation

A backcoat formulation is prepared by mixing deionized water, silicone resin block copolymers and an antifoaming agent in the proportions indicated in Table 1 at ambient temperature for 30 minutes.

TABLE 1

| Material | Wt. % Dry | Grams Dry | Wt. % Total |
|---|---|---|---|
| Silicone Resin[1] | 100 | 4.3 | 4.3 |
| Antifoaming Agent[2] | 0 | 0 | 0.05 |
| Deionized Water | 0 | — | 95.65 |
| Total | 100.0 | 4.3 | 100 |

[1]DBP-534 Dimethylsiloxane-propylene oxide-ethylene oxide block copolymer (MW approximately 30,000), available from Gelest Inc., 612 William Leigh Dr., Tullytown, PA 19007-6308.
[2]Dapro DF-1161 antifoaming agent available from Daniel Products Co., 400 Claremont Avenue, Jersey City, NJ.

THERMAL TRANSFER RIBBON

A thermal transfer ribbon of the present invention is prepared by coating a conventional functional layer onto one side of a 3.5 μm Polyester Mylar Film by E.I. Dupont de Nemours & Co. The coating is allowed to dry at a temperature of about 50 C. The coated film is processed further to deposit a backcoat layer on the opposite side thereof from a formulation as defined above in Table 1, using a #0 Meyer rod at ambient temperature.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermal transfer ribbon comprising a flexible substrate and a thermal transfer layer positioned on one surface of the flexible substrate and a backcoat positioned on the opposite surface comprising a water-soluble silicone block copolymer, wherein the water-soluble silicone block copolymer comprises silicone blocks of the formula $$R'_3—SiO(SiR_2O)_x(\overset{\displaystyle Q}{\overset{|}{Si}}R'''O)_y—SiR''_3$$

wherein R, R', R" and R'" are each, independently selected from the group consisting of H, OH, $CH_3$, ethyl or propyl, Q is the link to blocks of a water-soluble polymer, and x and y are 1 or more.

2. A thermal transfer ribbon as in claim 1, wherein the silicone block copolymer comprises blocks of water-soluble polymer selected from the group consisting of polyethylene oxide blocks, polypropylene oxide blocks and combinations thereof.

3. A thermal transfer ribbon as in claim 2, wherein the polyethylene oxide blocks are of the formula $$—(CH_2)_3—(OCH_2CH_2)_z—OCH_3,$$

where Z is 1 to 100 and the polypropylene oxide blocks are of the formula $$—(CH_2)_3—(OCH_2CH_2CH_2)_z—OCH_3,$$

wherein Z is 1 to 100.

4. A thermal transfer ribbon as in claim 1, wherein the backcoating contains from 0.01 to 2 wt. % antifoaming agent based on the weight of water-soluble silicone block copolymer.

5. A thermal transfer ribbon as in claim 1, wherein the backcoat is formed from an aqueous coating formulation comprising water, antifoaming agent and from 1 to 10 wt. % water-soluble silicone block copolymers applied to the substrate with a #0 Meyer rod.

6. A thermal transfer ribbon as in claim 5, wherein the aqueous coating formulation is free of emulsifiers.

7. A thermal transfer ribbon as in claim 8 wherein the back coat is free of water soluble polymers other than water-soluble silicone block copolymers.

8. A thermal transfer ribbon as in claim 1, wherein the backcoat is free of emulsifiers.

9. A thermal transfer ribbon comprising a flexible substrate and a thermal transfer layer positioned on one surface of the flexible substrate and a backcoat positioned on the opposite surface comprising a water-soluble silicone block copolymer having a weight average molecular weight of about 30,000.

10. A thermal transfer ribbon as in claim 5, wherein the aqueous coating formulation is free of water-soluble polymers other than water-soluble silicone block copolymers.

11. A thermal transfer ribbon comprising a flexible substrate and a thermal transfer layer positioned on one surface of the flexible substrate and a back coat positioned on the opposite surface comprising a water-soluble silicone block copolymer comprising blocks of water-soluble polymers selected from the group consisting of polyethylene oxide blocks polypropylene oxide blocks and combinations thereof, wherein the water-soluble polymer blocks comprise at least 50 wt. % of the silicone block copolymer.

12. A thermal transfer ribbon as in claim 11, wherein the water-soluble polymer blocks comprise 50%–60% propylene oxide blocks and 40%–50% ethylene oxide blocks.

* * * * *

UNITED STATES PATENT AND TRADEMARK OFFICE

CERTIFICATE OF CORRECTION

PATENT NO. : 6,245,416 B1
DATED : June 12, 2001
INVENTOR(S) : Joseph D. Roth

It is certified that error appears in the above-identified patent and that said Letters Patent is hereby corrected as shown below:

Column 8,
Please amend the claims as follows, lines 29-33 delete:
"7. A thermal transfer ribbon as in claim 8, wherein the backcoat is free of water soluble polymers other than water soluble block copolymers.

8. A thermal transfer ribbon as in claim 1, wherein the backcoat is free of emulsifiers." and insert
-- 7. A thermal transfer ribbon as in claim 1, wherein the backcoat is free of emulsifiers.

8. A thermal transfer ribbon as in claim 7, wherein the backcoat is free of water soluble polymers other than water soluble silicon block copolymers. --

Signed and Sealed this

Twenty-third Day of April, 2002

*Attest:*

JAMES E. ROGAN

*Attesting Officer* *Director of the United States Patent and Trademark Office*